United States Patent [19]
Kobori et al.

[11] 3,906,518
[45] Sept. 16, 1975

[54] MECHANICAL EXPOSURE TIME CONTROL MECHANISM FOR USE IN A FOCAL PLANE SHUTTER FOR PHOTOGRAPHIC CAMERA

[75] Inventors: Toshio Kobori; Toru Sumita, both of Sakai, Japan

[73] Assignee: Minolta Camera Kabushiki Kaisha, Japan

[22] Filed: Oct. 24, 1973

[21] Appl. No.: 409,154

[30] Foreign Application Priority Data
Oct. 30, 1972 Japan............................ 47-109043

[52] U.S. Cl. ................. 354/51; 354/146; 354/235; 354/267
[51] Int. Cl.²......................................... G03B 9/64
[58] Field of Search .......... 354/267, 146, 137, 235, 354/51

[56] References Cited
UNITED STATES PATENTS
2,552,213  5/1951  Pribus et al........................ 354/146
2,800,063  7/1957  Wagner............................... 354/146
3,420,153  1/1969  Fukushima.......................... 354/267

*Primary Examiner*—Samuel S. Matthews
*Assistant Examiner*—Russell E. Adams, Jr.

[57] ABSTRACT

In association with a focal plane shutter for a photographic camera, there is provided a mechanical exposure time control mechanism adapted to bring about a desired exposure time by utilizing a movable projection which is in rest position when the associated rotary shaft is still, said rotary shaft being adapted to rotate at a high speed in cooperation with the shutter releasing member upon a shutter releasing operation, said movable projection then assuming an operating position in which said projection protrudes from said rotary shaft under the centrifugal force created by said high speed rotation of the rotary shaft, whereby the shutter closing member is released from locked position so as to complete the exposure.

8 Claims, 5 Drawing Figures

MECHANICAL EXPOSURE TIME CONTROL MECHANISM FOR USE IN A FOCAL PLANE SHUTTER FOR PHOTOGRAPHIC CAMERA

BACKGROUND OF THE INVENTION

This invention relates to a mechanical exposure time control mechanism for use in a focal plane shutter for a photographic camera, said mechanism being adapted to control the duration of a desired exposure time by causing the shutter closing member to move when a rotary shaft is rotated at a desired R.P.M., said rotary shaft being adapted to cooperate with a shutter releasing member, and more particularly to a mechanism of the type described which enables a flash photographing by means of a flash device having a short flashing duration, such as an electronic flash, wherein one frame of the film may be entirely exposed.

A mechanical exposure time control mechanism for use in a focal plane shutter has previously been proposed by one of the inventors of the present invention, as disclosed in U.S. Ser. No. 234,932 and in German Patent application No. P 2212673.4, wherein there is provided a projection adapted to rotate with the rotation of a forward curtain shaft, and when the forward curtain shaft is rotated due to the shutter releasing operation, said projection will engage with the locking member of the rear curtain shaft, thereby completing the exposure.

However, such a mechanism suffers from the disadvantage that the time from the releasing operation until the commencement of travel of the rear curtain is limited to the time required for one rotation of the forward curtain shaft, whereby the shutter speed obtained will be shorter than 1/125 second, thus presenting difficulties in obtaining a shutter speed lower than 1/125 second. It follows that the flash photographing may not be properly effected in the case of a flash device having a short flashing duration.

More particularly, if the flashing is effected during the travelling of the shutter opening member or shutter closing member in a focal plane shutter, a non-uniform exposure will result. It is imperative that the flashing be effected during the time after completion of the travel of the shutter opening member and before the commencement of travel of the shutter closing member.

Accordingly, it is an object of the invention to provide a mechanical exposure time control mechanism for use in association with a focal plane shutter for a photographic camera, wherein the rotation of a rotary shaft will release the shutter closing member from a locked position, when the said rotary shaft rotates at a desired R.P.M. after the shutter opening member has commenced its travel, said rotary shaft being adapted to cooperate with said shutter opening member.

It is a further object of the invention to provide a mechanical exposure time control mechanism for use in a focal plane shutter for a photographic camera, wherein a locking member may be released, after said rotary shaft rotates at at least a desired R.P.M., said locking member being adapted to prevent movement of the shutter closing member.

It is a still further object of the invention to provide a mechanical exposure time control mechanism for use in a focal plane shutter for a photographic camera, which accommodates the flashing, in a flash photographing, of a flashing device having a short flashing duration, such as an electronic flash device.

It is a yet further object of the invention to provide a mechanical exposure time control mechanism for use in a focal plane shutter for a photographic camera of the type in which the exposure may be controlled by an electric exposure control circuit, said mechanism being adapted to mechanically control the shutter speed so as to afford a relatively longer exposure time.

These and other objects and features of the invention will be apparent from the reading of the following specification with reference to the embodiment which will be described in detail hereinafter.

SUMMARY OF THE INVENTION

It has now been found that the foregoing and related objects can be readily attained in a mechanical exposure time control mechanism for use in a focal plane shutter for a photographic camera, wherein there is provided a movable member adapted to project from a rotary shaft which is adapted to rotate in cooperating with the travel of the shutter opening member, said movable member being in a rest position when said rotary shaft is still, while said movable member is adapted to protrude from said rotary shaft under the centrifugal force which is created commensurate to the rotational speed of said rotary shaft, and wherein said movable member is shifted to an operating position in which said movable member engages with a locking member for the shutter closing member, when said rotary shaft rotates at a desired R.P.M., whereby the shutter closing member may be released from the locked position for the purpose of controlling the exposure to a desired exposure time determined by the desired shutter speed.

A given shutter speed relatively slower than about 1/125 second may be set by releasing the shutter closing member from locked position using a movable member adapted to shift from a rest position to an operating position under the centrifugal force created, when the rotary shaft rotates by no less than one turn, said rotary shaft being adapted to rotate with the commencement of travel of the shutter opening member.

Thus, a desired shutter speed may be obtained by a simple mechanical exposure time control mechanism, said shutter speed accommodating a flash device having a short flashing duration, such as an electronic flash device.

With such a mechanical control for the exposure time for use in a focal plane shutter normally controlled by an electric exposure control circuit, there is no depletion of the electric power source, when the flash photographing is repeated, while photographing is possible even in case the voltage at the electric power source drops below a given value.

Furthermore, the present invention presents a novel construction for the mechanical exposure time control mechanism, wherein the shutter closing member may be released from the locked position by the rotation of the rotary shaft of more than one turn, said shutter closing member being adapted to be locked by means of a locking member, and wherein the aforesaid releasing operation may be effected by means incorporated in said rotary shaft, i.e., without the aid of another means not coaxial with said shaft, so that the exposure control for a relatively longer exposure time may be achieved by means of a compact mechanical exposure time control mechanism.

BRIEF DESCRIPTION OF THE DRAWINGS

FIGS. 2 and 3 are plan views showing the relationship of the forward curtain shaft, in the aforesaid embodiment, to the movable member and the rear curtain locking member, in which FIG. 2 shows the movable member in a rest position and FIG. 3 shows the movable member in an operating position;

DETAILED DESCRIPTION OF THE INVENTION

Figure 1:
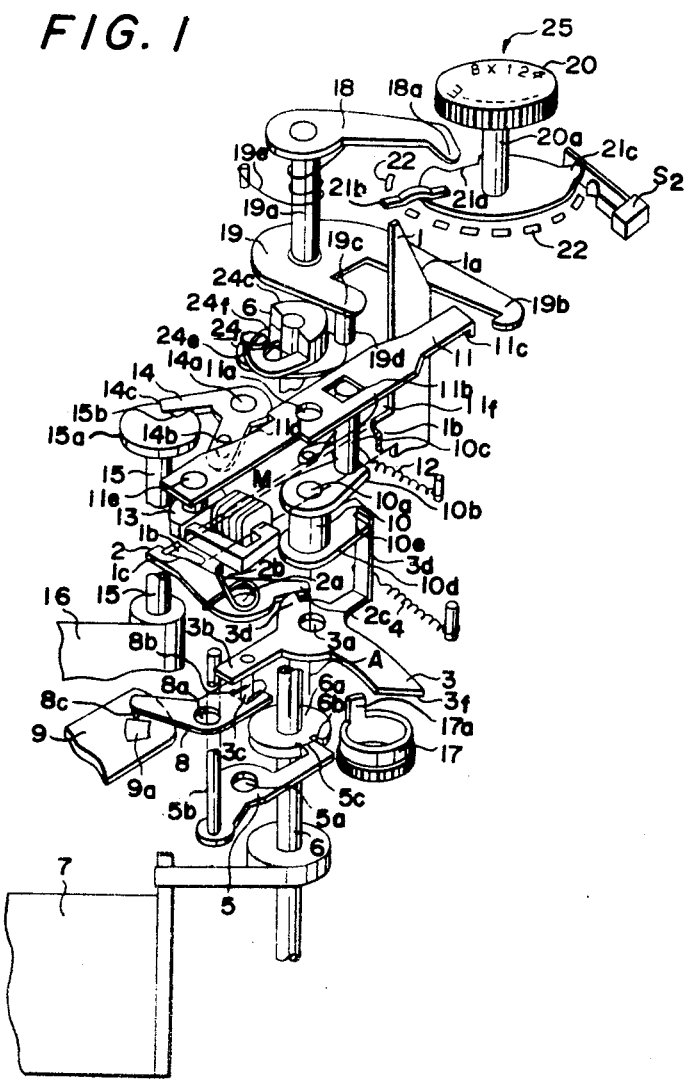
FIG. 1 is a perspective view of essential parts of one embodiment of the present invention.

Referring now to FIG. 1 which shows one embodiment of the invention, shown at 1 is a release plate adapted to be biased by a means of a spring member (not shown) to a raised position, said plate being adapted to slide vertically with respect to a camera body. The release plate 1 is formed with a releasing slanting face 1a on one side thereof, and formed with an arm 1b extending horizontally and having a slanting face 1c on the end thereof, said releasing slanting face 1c being adapted to engage with a release lever 2, which will be described later, when the release plate 1 is lowered by the releasing operation against the aforesaid spring action.

A release lever 2, whose one arm is engageable with the slanting face 1c adapted for releasing operation, is rotatably journaled on a shaft of the camera body through its shaft hole 2a and tends to rotate, under the motion of a spring 2b, in a clockwise direction, said lever 2 having the other arm formed with a hook portion 2c.

A control plate 3 is rotatably journaled on the camera shaft A through its shaft hole 3a and tends to rotate, under the motion of a spring 4, in a clockwise direction, said control plate 3 being formed with a pawl 3d engageable with said hook portion 2c, a switch operating lever 3b having a pin 3c protruding from the tip thereof, a bent portion 3d engageable with a drive lever 10 which will be described hereinafter, and an arm 3f engageable with a charging member 17 which will be described hereinafter.

Figure 5:
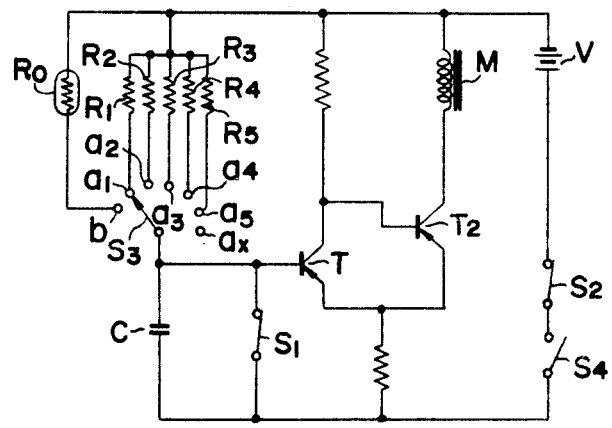
FIG. 5 is a circuit diagram of the exposure time control circuit as used in the aforesaid embodiment.

A switch lever 8, which is rotatably journaled with respect to the camera body through its shaft hole 8a, is formed with a fork 8b engageable with said pin 3c on its arm and with a sliding contact 8c on the other arm. A plate 9, which the contact 8c contacts slidingly, is formed with an insulating face 9a on its electrically conductive surface, whereby a trigger switch $S_1$ for an electric shutter control circuit is formed as shown in FIG. 5.

A pin 5b engageable with the operating lever 3b of said control plate 3 is anchored in a forward curtain locking lever 5 which is rotatably journaled with respect to the camera body through its shaft hole 5a and is formed with a locking pawl 5c.

A cam 6a is fixed on a forward curtain shaft 6, around which is wound a forward curtain 7, whereby said locking pawl 5c is adapted to engage with the notch 6b formed in said cam 6a, when the shutter is in a cocked position.

A drive member 10, which is rotatably journaled on said shaft A through shaft hole 10a, is formed with levers 10b and 10d on its upper and lower sides, while the bent portion 3d of said control plate 3 is adapted to engage with a notch 10e formed in lever 10d on the lower side, a drive pin 10c being anchored in the lever 10b on the upper side.

A rear curtain lever 11 is rotatably journaled on said shaft A through its shaft hole 11a and tends to rotate under the action of a spring 11f in a counterclockwise direction, said lever 11 having one arm formed with an opening 11b, into which said drive pin 10c is loosely fitted while an engaging pawl 11c is formed on the tip of said arm. The lever 11 has another arm formed with a slanting edge 11d and a bearing 11e, in which is journaled an armature 13 facing an electromagnet M which is adapted to be energized by the output from said electrical shutter control circuit.

A pin 14b engageable with said slanting edge 11d is anchored in the rear curtain locking lever 14 which is rotatably journaled with respect to the camera body through its shaft hole 14a, and said lever 14 has a locking pawl 14c.

A cam 15a is fixed on a rear curtain shaft 15, around which is wound a rear curtain 16, said cam being formed with a notch 15b. The locking pawl 14c is engageable with the cam 15a and adapted to engage with the notch 15b, when the rear curtain 16 is in a cocked position.

Figure 2:
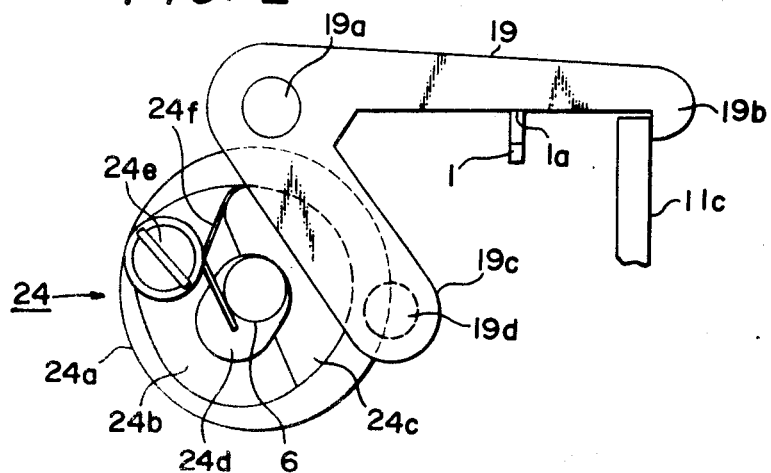
Figure 4:
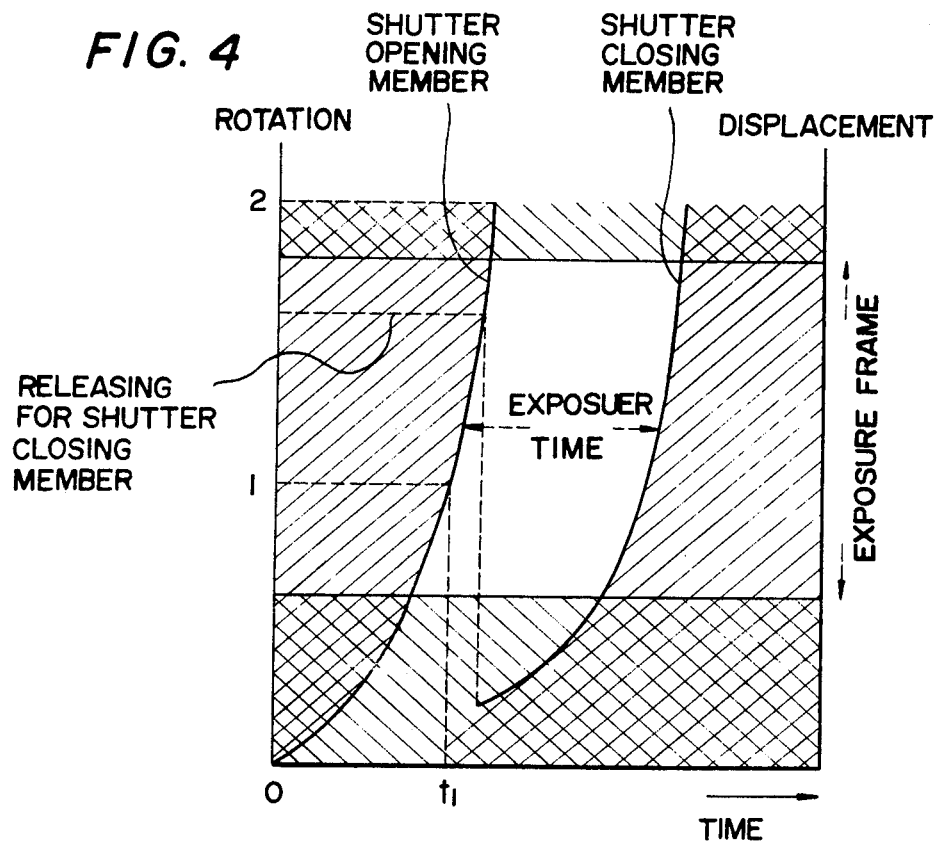
FIG. 4 is a plot showing the relationship of the speed of the shutter curtains to the rotation of the forward curtain shaft.

Provided on the upper surface of a shutter speed setting dial 20 are an automatic exposure time control graduation designated by a character E and used for electrical control, an electric manual exposure time setting graduation, represented by FIGS. 1, 2, 4, . . . a mechanical exposure time control graduation represented by a character X and a graduation for use in bulb photographihg, represented by a character B, whereby respective control may be selected by aligning such graduations with the index 25 provided on the camera body.

A shutter speed setting cam plate 21 is fixed on a shaft 20a of said shutter speed setting dial, said shutter speed setting cam plate 21 being formed with a recess 21a on its circumference as well as with a contact piece 21b protruding radially therefrom. The aforesaid contact piece 21b selects either one of a contact b of a switch $S_3$, (FIG. 5), contacts $a_1, a_2, \ldots a_5$ and contact $a_x$ which is adapted to interrupt said electric control circuit for a mechanical exposure control, said switch $S_3$ being adapted to constitute an electrical control circuit by connecting a condensor C to either a photoconductive element Ro or one of several shutter speed setting resistors $R_1, R_2 \ldots R_5$, as shown in FIG. 5, depending on the selection of the shutter speed setting dial. The cam plate 21 has a projection 21c protruding radially and is adapted to open an electric power source switch $S_2$, only when the character X on the dial 20 is aligned with the index 25.

A lever 18 is fixed on a shaft 19a having a rotational tendency in a clockwise direction under the motion of a spring 19e, said lever 18 having on its tip a contact piece 18a adapted to slidingly contact said shutter speed setting cam plate 21a, while a mechanical exposure control locking lever 19 is fixed on said shaft 19a.

The locking lever 19 is formed with forked arms 19b and 19c, said arm 19b being adapted to engage for locking with the engaging pawl 11c of said rear curtain operating lever 11 and said arm 19c being adapted to release the locking and having releasing pin 19d anchored therein, while the slanting operating face 1a of said release plate 1 is engageable with the side edge of said locking arm 19b, pin 19d being engageable with a releasing member 24 which will be described later.

Figure 3:
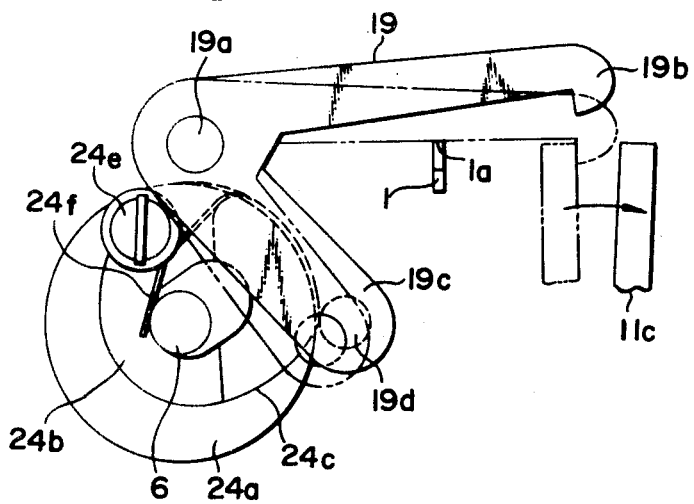

An operating cam 24b (FIGS. 2 and 3) has a shaft 24e journaled in biased relation in a plate 24a which is fixed on the tip of said forward curtain shaft 6 and tends to rotate in a clockwise direction under the action of a spring 24f, said operating cam 24b having an elongated hole 24d, through which said shaft 6 extends loosely, as shown in FIGS. 2 and 3. Accordingly, said elongated hole 24d engages with the forward curtain shaft 6 on one edge thereof. Since the operating cam 24b is formed with a thicker wall portion 24c, the center of gravity thereof is off-set to the side of said thicker wall portion 24c. Thus, when the forward curtain shaft 6 rotates and then the operating cam 24b rotates with the plate 24a, then the operating cam 24b will shift, as shown in FIG. 3, toward the thicker wall portion with respect to the plate 24a and rotates, with the other end of said elongated hole 24d abutting the forward curtain shaft 6. In this condition, the aforesaid thicker wall portion 24c engages with the aforesaid releasing pin 19d, thereby causing the locking lever 19 to rotate against the spring action of the spring 19e, with the result that the locking arm 19b is released from the engagement with the engaging pawl 11c.

A gear 17 has a projection 17a, and when the shutter is brought into a cocked position in cooperation with the winding operation, then the projection 17a rotates the control plate 3 in a counter clockwise direction to thereby bring the pawl 3d into engagement with the hook portion 2c of the release lever 2. Then, the locking pawl 5c of the forward curtain locking lever 5 engages with the notch portion 6b of the cam 6a, the rear curtain operating lever 14 rotates, via bent portion 3d and the drive member 10, in a counter clockwise direction, and the locking pawl 14c of the rear curtain locking lever 14 engages with the notch 15b of the cam 15a to thereby bring the rear curtain into a cocked position.

In an electrical control circuit, the photoconductive element Ro and shutter speed setting resistors $R_1$, $R_2$, ... $R_3$ are arranged in parallel with each other as shown in FIG. 5 and connected to an electric power source V, said electroconductive element Ro having a terminal $b$ and said shutter speed setting resistors having terminals $a_1$ through $a_5$ in addition to the terminal $a_x$, not connected to the electric power source V, whereby the movable contact piece 21b of the switch $S_3$ may select any one of the aforesaid terminals. The switch $S_3$ is connected to a capacitor C, said trigger switch $S_1$ being provided so as to shunt the capacitor C, the terminal on the switch $S_3$ side of the capacitor C being connected to the base of the transistor T and the electromagnet M being connected to the collector of the transistor $T_2$ of said switching circuit. In passing, the switch $S_2$ is an electric power source switch, while the switch $S_4$ to bring those in series connection will be closed in connection to the releasing operation. In this respect, the switch $S_2$ is normally closed and will be brought into an open position only when the dial 20 is set to X.

As is apparent from the foregoing description, when the shutter speed dial 20 is rotated and the graduation E is aligned with the index 25, the contact piect 21b will be connected to the capacitor C to thereby control the electric shutter speed automatically, commensurate to the brightness of a photographic object. On the other hand, when the digital graduation is aligned with the index 25, either one of the shutter speed setting resistors $R_1$ to $R_5$ will be connected to the capacitor C, whereupon, commensurate to the resultant resistance, the shutter speed will be set electrically. In such cases, the locking arm 19b is maintained in a retracted position from the engaging pawl 11c, by means of shutter speed setting plate 21 and contact piece 18a.

When the shutter release plate 1 is depressed due to the shutter releasing operation, then the switch $S_4$ will be closed and the electromagnet M will be excited to thereby attract the armature 13 thereto. Then, the release lever 2 will be rotated against the spring action of spring 2b in a counterclockwise direction by means of the operating slanting face 1c, without causing the engagement of the locking arm 19b with the engaging pawl 11c, and then the control plate 3 is released from locking condition by means of the hook portion 2c to thereby be rotated in a counterclockwise direction under the action of the spring 4, while the trigger switch $S_1$ is released when the contact point 8c of the switch lever 8 reaches insulating face 9a, whereupon the locking pawl 5c of the forward locking lever 5 will be disengaged from the cam plate 6a and the forward curtain shaft 6 will be rotated and the forward curtain 7 will commence travelling. Meanwhile, the rear curtain 16 is locked due to the excitation of the electromagnet M.

When the voltage at the capacitor C reaches a given level, then the switching circuit will be reversed, the feeding of the electricity to the electromagnet will be interrupted, the rear curtain operating lever 11 will be rotated under the action of the spring 12 in a clockwise direction, and the rear curtain locking lever 14 will be rotated in a clockwise direction to thereby release the cam 15a from the locking pawl 14c, causing the rear curtain shaft 15 to rotate for the completion of the exposure.

In contrast thereto, when the character graduation X is aligned with the index 25, then the contact piece 18a will be positioned in the recess 21a to thereby release the locking lever 19 for rotation in a clockwise direction, while the contact piece 21b will be in contact with the terminal ax and the electric power source switch $S_2$ will be opened by the projection 21c of the dial 20, with the result that the electric control circuit will be brought into an inoperative condition.

When the release plate is depressed under such conditions, the operating slanting face 1a thereof will permit the locking lever 19 to rotate in a clockwise direction urged by the spring 19e, whereby the locking arm 19b thereof will engage with the engaging pawl 11c of the rear curtain operating lever 11, thus locking the rear curtain operating lever 11 in position to prevent the clockwise rotation thereof.

At this time, even if the switch $S_4$ is closed, there will be no excitation of the electromagnet M, since the switch $S_2$ is kept open and thus the electrical control circuit is maintained in an inoperative condition. When the release plate 1 is depressed a step further and thus the release lever 2 is rotated in a counterclockwise direction as has been described, to thereby release control plate 3 from the locked condition, then the control plate 3 will be rotated under the action of the spring 4 in a clockwise direction to cause the switch lever 8 to rotate in a counterclockwise direction, so that the forward curtain locking lever 5 adapted to engage with the operating lever 3b of said control plate 3 at the pin 5b will be rotated in a clockwise direction to release the forward curtain shaft from the locked condition, whereupon the forward curtain will commence its travel, while the rear curtain shaft 15 is locked by means of the rear curtain locking lever 14, and the exposure will be commenced.

As can be seen from FIG. 4, the rotation of the forward curtain shaft 6 is slow upon starting, due to inertia, whereas the rotational speed thereof will be gradually increased as it rotates. Thus, as the rotational speed increases during the time $t_1$ required for one rotation, there will be created a centrifugal force commensurate to the rotational speed thus increased, and thereby the operating cam 24b will be biased to the thicker wall portion 24c, whereby the outer circumference of the thicker wall portion 24c will shut against the release pin 19d by being rotated, to thereby rotate the release arm 19c in a counterclockwise direction. As a result, the rear curtain operating lever 11 will be released from the locking arm 19b, then the rear curtain releasing lever 11 will be rotated in a clockwise direction, the rear curtain locking lever 14 rotated in a clockwise direction to release the rear curtain shaft 15 to cause the rear curtain 16 to travel, thus completing the exposure. According to the present invention, when the shutter speed dial selects the graduation X, then a shutter speed relatively slower than the exposure time $t_1$ may be obtained due to the mechanical control.

With the conventional focal plane shutter, the time required for the forward curtain shaft to rotate one turn is shorter than 1/125 second, while the time required for two turns is shorter than 1/60 second.

In addition, it is so designed that the travel of the forward curtain is completed when the forward shaft rotates over two turns. Thus, if the thicker wall portion 24c of the operating cam 24b is so designed as to engage with the rear curtain operating lever 11 when said shaft makes two turns, the shutter speed may be controlled for 1/60 second, so the film may be exposed in its entirety during that time. Accordingly, if electronic flash is effected during such a time period, then there may result uniform flash photographing by using an electronic flash.

Although the invention has been described in the preferred form with a certain degree of particularity, it is understood that the preferred form can be changed in the details of construction, and a different combination and arrangement of parts may be resorted to without departing from the spirit and the scope of the invention as hereinafter claimed.

What is claimed is:

1. A mechanical exposure time control mechanism for the focal plane shutter of a photographic camera, comprising:
   shutter opening and closing members;
   a member for locking said shutter closing member in cocked position;
   a rotary shaft;
   means for rotating said shaft actuated by the opening operation of said opening member;
   a cam comprising a movable member connected to rotate with said rotary shaft and having a center of gravity offset with respect to said rotary shaft, means urging said center of gravity toward the rotational axis of said rotary shaft, said member being movable either to a first position when said rotary shaft stands still or to a second position in which said member moves away from said rotary shaft radially due to centrifugal force when said rotary shaft rotates at a speed greater than a given rotational speed; and
   cam follower means for releasing said shutter closing member from locked condition by engagement of said movable member with said last means when said movable member is in the second position.

2. A mechanical exposure time control mechanism for the focal plane shutter as set forth in claim 1, said rotary shaft rotating at least one turn upon the opening operation of said shutter opening member and wherein said movable member assumes the second operational position when the rotation of said rotary shaft reaches the rotational speed attained when said shaft rotates at least one turn.

3. A mechanical exposure time control mechanism for the focal plane shutter as set forth in claim 1, wherein said mechanism further comprises:
   an electrical exposure time control circuit including a timing circuit designed to operate in synchronism with the opening operation of said shutter opening member;
   an electromagnet for releasing the locking member for said closing member upon being actuated by the output from said electrical control circuit;
   a selecting member for selecting between the electrical exposure time control or the mechanical exposure time control;
   a switch means for bringing said electrical control circuit into operative condition in association with the shutter releasing operation when said selecting member selects the electrical exposure control, and for preventing said electrical control circuit from being brought into operative condition when said selecting member selects the mechanical exposure time control; and
   means for preventing the engagement of said movable member in the second position with said means for releasing the shutter, when said selecting member selects the electrical exposure time control.

4. A mechanical exposure time control mechanism for a focal plane shutter as set forth in claim 3 comprising a multiple position switch means operably connected to said selecting member;
   said multiple position switch assuming a first position when said selecting member has selected mechanical exposure time control, and a second plurality of positions when said selecting member has selected electrical exposure time control;
   a photoelectric element connectable to said timing circuit when said multiple position switch is in one of the plurality of second positions; and
   a plurality of resistors selectively connectable to said timing circuit when said multiple position switch is in one of said plurality of second positions other than said one position.

5. A mechanical exposure time control mechanism for the focal plane shutter as set forth in claim 1, wherein said mechanism further comprises:
   spring means for urging the center of gravity of said movable member toward the axis of said rotary shaft; and means for maintaining the center of gravity of said movable member in a first position away from the axis of said rotary shaft against the action of said spring means.

6. A mechanical exposure time control mechanism for the focal plane shutter as set forth in claim 5, wherein said movable member has its center of gravity in a position away from the axis of the rotary shaft at the rotational speed of the rotary shaft attained when said rotary shaft rotates for at least one turn, and wherein said movable member in the said first position is adapted to shift to the said second position, against the action of said spring means, due to centrifugal force.

7. A mechanical exposure time control mechanism for the focal plane shutter as set forth in claim 3, wherein said means for releasing includes a first lever urged in the direction to release the locking member of said shutter closing member, and a second member movable in response to the shutter releasing operation to a position for preventing said first lever from releasing the locking member and movable away from said last mentioned position by engagement with said movable member; said means for preventing including cam means for preventing said second lever from moving to said preventing position when said selecting member selects the electrical exposure time control.

8. In a control mechanism for a camera shutter having a first shutter member movable from a cocked position to a rest position to initiate exposure, a second shutter member movable from a cocked position to a rest position to terminate the exposure, a retaining member for retaining said second shutter member at the cocked position thereof and a release member for releasing the restraint of said second shutter member, the improvement comprising:

an operating member rotatable in accordance with the movement of said first shutter member from the cocked position to the rest position thereof said operating member having a cam surface and said release member having a follower adapted to be moved by said cam surface for releasing said second shutter;

means for urging said operating member to a position in which said follower is out of the path of said cam surface means for allowing said operating member to move radially by reason of centrifugal force when said operating member rotates at a speed higher than a predetermined level, so that said cam surface may engage and actuate said follower at least during the second rotation of said operating member.

* * * * *